United States Patent [19]

Li et al.

[11] E Re. 30,179

[45] Reissued * Dec. 25, 1979

[54] COMMON ION EFFECT TO ASSIST LM SEPARATION

[75] Inventors: Norman N. Li; Robert P. Cahn, both of Millburn; Adam L. Shrier, Montclair, all of N.J.

[73] Assignee: Exxon Research & Engineering Co., Florham Park, N.J.

[ * ] Notice: The portion of the term of this patent subsequent to Jan. 25, 1989, has been disclaimed.

[21] Appl. No.: 951,078

[22] Filed: Oct. 13, 1978

Related U.S. Patent Documents

Reissue of:

[64] Patent No.: 4,081,369
Issued: Mar. 28, 1978
Appl. No.: 668,128
Filed: Mar. 18, 1976

U.S. Applications:

[60] Continuation-in-part of Ser. No. 404,716, Oct. 9, 1973, which is a division of Ser. No. 174,990, Aug. 25, 1971, Pat. No. 3,779,907, which is a continuation-in-part of Ser. No. 36,686, May 12, 1970, Pat. No. 3,637,488, which is a continuation-in-part of Ser. No. 28,094, Apr. 13, 1970, Pat. No. 3,617,546.

[51] Int. Cl.[2] ..... B01D 13/00; C02B 1/46

[52] U.S. Cl. ..... 210/22 R; 210/23 R; 210/28; 210/42 R; 252/188.3 R

[58] Field of Search ..... 210/21, 22 R, 23 R, 210/23 H, 23 A, 24, 28, 42 R, 59; 252/188 R, 309

[56] References Cited

U.S. PATENT DOCUMENTS

| | | | |
|---|---|---|---|
| 2,299,693 | 10/1942 | Green | 252/188.3 R X |
| 3,057,804 | 10/1962 | Berkeley et al. | 252/118 |
| 3,637,488 | 1/1972 | Li et al. | 210/22 R |
| 3,714,062 | 1/1973 | Askew et al. | 252/309 X |
| 3,719,590 | 3/1973 | Li et al. | 208/308 |
| 3,779,907 | 12/1973 | Li et al. | 210/23 R |

OTHER PUBLICATIONS

Skoog et al., "Fundamentals of Analytical Chemistry," Holt, Rinehart, & Winston, New York (1963).

*Primary Examiner*—Thomas G. Wyse
*Attorney, Agent, or Firm*—Jerome E. Luecke

[57] ABSTRACT

The instant invention relates to an improvement in the liquid membrane process for removing soluble materials from solution. More specifically, in a process wherein soluble materials are removed from solution by contacting said solution with an emulsion, the external phase of which is immiscible with said solution and permeable to said soluble materials and the internal phase contains a reactant which reacts with said soluble material and converts said soluble material to a material which is insoluble and thus trapped in the internal phase, the improvement which comprises maintaining the concentration of said reactant in the internal phase of the emulsion at a level at which the concentration of said soluble material in the internal phase of the emulsion is less than the concentration to which it is desirable to lower said soluble material in said solution. Preferably the solution is aqueous and said soluble material is a salt. In a preferred embodiment of the instant invention the concentration of fluoride ion in an aqueous solution is lowered to less than 6 ppm by contacting said solution with an emulsion containing a soluble calcium salt in the internal phase. The concentration of calcium in said internal phase is maintained at a level sufficient to provide a concentration of less than 6 ppm soluble fluoride ion in said internal phase.

10 Claims, No Drawings

COMMON ION EFFECT TO ASSIST LM SEPARATION

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of U.S. Ser. No. 404,716 filed Oct. 9, 1973 in the names of Norman N. Li, Robert P. Cahn and Adam L. Shrier which is division of U.S. Ser. No. 174,990 filed Aug. 5, 1971 (now U.S. Pat. No. 3,779,907 granted Dec. 18, 1973), which is a continuation-in-part of [Ser. No. 99,267, filed Dec. 17, 1970 (now U.S. Pat. No. 3,719,590, granted Mar. 6, 1973)] *Ser. No. 36,686, filed May 12, 1970 (now U.S. Pat. No. 3,637,488, granted Jan. 25, 1972)* [and ] *which* is a continuation-in-part of Ser. No. 28,094 filed Apr. 13, 1970 (now U.S. Pat. No. 3,617,546, granted Nov. 2, 1971).

FIELD OF THE INVENTION

The instant invention relates to an improvement in the liquid membrane process for removing soluble materials from solution. More specifically, in a process wherein soluble materials are removed from solution by contacting said solution with an emulsion, the external phase of which is immiscible with said solution and permeable to said soluble materials and the internal phase contains a reactant which reacts with said soluble material and converts said soluble material to a material which is insoluble and thus trapped in the internal phase, the improvement which comprises maintaining the concentration of said reactant in the internal phase of the emulsion at a level at which the concentration of said soluble material in the internal phase of the emulsion is less than the concentration to which it is desirable to lower said soluble material in said solution. Preferably the solution is aqueous and said soluble material is a salt. In a preferred embodiment of the instant invention the concentration of fluoride ion in an aqueous solution is lowered to less than 6 ppm by contacting said solution with an emulsion containing a soluble calcium salt in the internal phase. The concentration of calcium in said internal phase is maintained at a level sufficient to provide a concentration of less than 6 ppm soluble fluoride ion in said internal phase.

BACKGROUND OF THE PRIOR ART

Liquid membrane processes are known for the removal of soluble materials from solution, for example, see U.S. Pats. Nos. 3,389,078 and 3,410,794, wherein hydrocarbons are separated from solution by means of a liquid membrane technique which comprises contacting said hydrocarbon-containing solution with an oil-in-water emulsion, said oil being a solvent for said hydrocarbon and said hydrocarbon being capable of permeating through the water phase of said emulsion. In these processes permeation of the hydrocarbon from solution into the internal phase of the emulsion continues until the concentration of said hydrocarbon in the solution and in the internal phase is equal. At this point there no longer exists a driving force for the hydrocarbon to permeate through the external phase of the emulsion into the internal phase. Thus processes of this nature are limited by the solubility requirements of the internal phase of the emulsion.

In U.S. Pat. No. 3,779,907 dissolved materials are removed from aqueous solution by the reverse method of contacting a water-in-oil emulsion with the solution and allowing permeation of said dissolved materials through the nonaqueous external phase into the aqueous internal phase of the emulsion. In this patent, however, the dissolved species continue to permeate through the oil phase, i.e. external phase of the emulsion, due to the fact that in the internal phase of the emulsion a reactant is present which converts the dissolved species to nonpermeable materials. In effect, the driving force is maintained by converting the permeable dissolved species into another form. This process, however, has also been found to be limited by the fact that certain conversions in the internal phase are not essentially complete, especially when the means of conversion in the internal phase is precipitation. Certain precipitating agents while effectively forming precipitates with the permeable species, form precipitates which are themselves slightly soluble. Thus, the permeable dissolved species is not completely removed from the aqueous solution but only removed down to a level approximately equal to the concentration of said permeable species soluble in said internal phase of the emulsion, i.e. the concentration of said permeable species due to the slight solubility of the precipitate.

It has now been found and is herein claimed as an invention that this heretofore limit on the liquid membrane processes can be overcome by maintaining the concentration of the precipitating agent at a level whereby due to the common ion effect the solubility of the permeable species in the internal phase is suppressed.

SUMMARY OF THE INSTANT INVENTION

The instant invention relates to a process for the removal of soluble materials from solution which comprises contacting said solution with an emulsion the external phase of which is immiscible with said solution and yet permeable to said soluble material and the internal phase comprising a reagent which will react with the permeable soluble material and convert same into an insoluble precipitate, the improvement which comprises maintaining the concentration of said reagent at a level whereby the concentration of said permeable soluble material soluble in the internal phase is suppressed by means of the common ion effect to a level below the level to which it is desired to remove said soluble material from said solution.

This invention is particularly applicable for removing dissolved salts, that is either the anion or the cation from aqueous solution. It is known in the art that various materials can be precipitated from aqueous solution. However, it is also known that the precipitates themselves are to a greater or less degree soluble in aqueous solutions. It is this limitation which has heretofore allowed otherwise operable liquid membrane processes to remove soluble salts only down to a level which is approximately equal to the concentration of the soluble salt in the internal phase of the liquid membrane emulsion due to the solubility of the precipitate in the internal phase. It is known that by means of the common ion effect that solubility of one or more of the anionic or cationic components of the water insoluble salt can be decreased. For example, due to the fact that the solubility product $Ks=[A^+][B^-]$ is fixed, increasing the concentration of $B^-$, i.e., increasing $[B^-]$ will decrease $[A^+]$ i.e., lower the concentration of soluble $A^+$. Thus, good removal of A can be obtained by maintaining a high concentration of B inside the membrane, i.e., in the internal phase of the emulsion.

The use of this technique will be exemplified below for the removal of fluoride ion from water. It should be pointed out, however, that this material is, for the purpose of example only and that those skilled in the art will readily appreciate that this technology is applicable to the removal of any dissolved compound from solution by means of liquid membrane process wherein said dissolved compound is converted in the internal phase of the emulsion into an insoluble precipitate by means of a double decomposition reaction, preferably ionic $$\underset{\text{(diss)}}{AC} + \underset{\text{(diss)}}{MB} \rightleftarrows \underset{\text{(ppte)}}{AB\downarrow} + \underset{\text{(diss)}}{MC}$$

Here, either "A" or "B" are the dissolved species which are to be removed, and by maintaining an excess of the other present in the internal solution, the solubility of AB is suppressed.

Thus, if A is the specie to be removed, an excess of MB is maintained in the internal solution, assuring a high concentration of $[M^+]$ and $[B^-]$ ions in the solution. As A diffuses across the membrane it will react according to the equilibrium reaction, above, or simply $$[A^+]+[B^-]\rightleftarrows[AB]\downarrow$$

which is set by the above mentioned solubility equilibrium $K_s=[A^+][B^-]$. Since there is a large excess of $B^-$, $[A^+]$ will be small and inward permeation of A will continue.

A similar argument holds when B is the specie to be removed, in which case an excess of AC is maintained in the internal solution.

An aqueous solution containing fluoride ion, for example, sodium or ammonium floride dissolved therein, is contacted with a water-in-oil emulsion under conditions whereby the emulsion is dispersed as drops in said aqueous solution. The emulsion, being of the water-in-oil type, is immiscible with said aqueous solution, thus, the external phase of the emulsion exists as an oil membrane surrounding droplets of the internal phase of said emulsion. The external phase of the water-in-oil emulsion is tailored by means known in the art (see the above liquid membrane patents and patent applications which are herein incorporated by reference) to be permeable to fluoride ion. For example, emulsions may be made up by emulsifying the aqueous internal phase in an oil phase comprising a polyamine derivative[1] as a membrane strengthening agent, Alamine 336 or Aliquot 336 as the transferring agent for the anionic fluoride, and SIOON[2] as the solvent to dissolve all the above

1

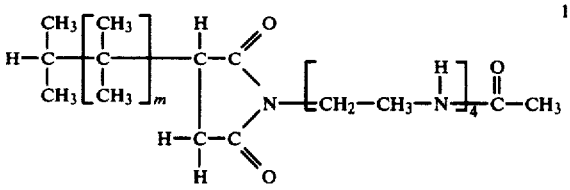

m is an integer of about 40, giving said polyamine derivatives a molecular weight of about 2000.

[2]An isoparaffin solvent having a carbon number range of from about 25 to 35, comprising 9% by weight aromatics, a specific gravity of 0.865 (at 60° F.), a flash point of 380° F., and kinematic viscosity of 22.6 centistokes at 100° F. compounds to make a uniform membrane. Both of the transferring agents are commercial products available from General Mills. Alamine 336 is a water insoluble, symmetrical, straight chain, saturated tertiary amine. The alkyl groups are a $C_8$-$C_{10}$ mixture with the $C_8$ carbon chain predominating. Aliquot 336 is tricaprylyl methyl ammonium chloride. In other words, it is a water insoluble quaternary made by the acetylation of a straight chain, saturated, symmetrical tertiary mine containing $C_8$–$C_{10}$ carbon chain (with the $C_8$ predominating).

The transfer of fluoride will be based on an ion-exchange mechanism. This means that the transferring agent in the membrane phase will complex with fluoride ions in the solution and move them across the membrane to the other side, where the transferring agent will release the fluoride ions and complex with another anionic species, such as $Cl^-$ and transfer it back to the solution. For further discussion of this mechanism, see copending U.S. Pat. Application Ser. No. 669,706, filed on Mar. 23, 1976 in the names of the instant inventors. Of course, in the internal phase of the emulsion, that is the aqueous phase utilized to make up the water-in-oil emulsion, a reagent which will react with fluoride ion and form a precipitate is incorporated. In general, a water-soluble calcium salt is utilized in the aqueous phase when it is desirable to remove fluoride, for example, calcium halides, especially calcium chloride, calcium nitrate, calcium acetate, calcium hydroide and combinations of these may be incorporated at a level of from 0.1 to 50 weight %. It is noted that it is critical in the practice of the instant invention that sufficient calcium be incorporated in the internal phase to yield an excess so that by the common ion effect solubility of the calcium fluoride precipitate will be suppressed. In general, the concentration of calcium ion in the internal phase should be about 0.05 wt. % or more, preferably 0.5–10%. It is noted that the amount of calcium ion necessary is dependent on how much fluoride ion must be removed from the aqueous solution. This calculation can readily be effected by anyone skilled in the art and is illustrated in the following table.

Table I

| Fluoride Concentration in Equilibrium with Excess Dissolved $CaCl_2$ at 25° C. | |
|---|---|
| Excess $CaCl_2$ Concentration Wt. % | Equilibrium Fluoride Concentration, ppm |
| 0 | 8.2 |
| 0.01 | 4.0 |
| 0.1 | 1.27 |
| 1 | 0.40 |
| 2 | 0.28 |
| 4 | 0.20 |
| 10 | 0.12 |
| 20 | 0.08 |
| 30 | 0.06 |
| 40 | 0.05 |

Note that the above table shows the effect of excess $CaCl_2$ over and above the quantity required to precipitate the fluoride permeating into the emulsion. Thus, if it is desired to spend 80% of a 10 weight % $CaCl_2$ emulsion, then 8 weight % of $CaCl_2$ will be converted into a 5.6 weight % $CaF_2$ precipitate, but 2 weight % of $CaCl_2$ will remain as excess dissolved salt, which allows the fluoride level in the remaining solution to rise no higher than 0.28 ppm. Therefore, the fluoride level in the solution being treated can be pulled down much lower than the 8.2 ppm indicated by the plain solubility product of $CaF_2$ alone.

Since the excess $CaCl_2$ is in the internal phase of the liquid membrane emulsion, it does not contaminate the solution being treated. On the other hand, if the low level of 0.28 ppm $F^-$ was to be obtained by straight precipitation via addition of $CaCl^2$ directly to the solution, a 2% residual excess of $CaCl_2$ would be left in the solution after the treat. This is a highly undesirable contaminant in the effluent. In another example, an aqueous solution comprising 1000 ppm fluoride ion is contacted with a water-in-oil emulsion containing 10 weight % calcium dichloride based on the aqueous phase contained in the emulsion. This emulsion is suitable for contacting approximately 37 volumes of said aqueous solution per volume of contained $CaCl_2$ solution. In this example which is carried out at room temperature it is known that calcium fluoride in stoichiometric amounts will yield 8 ppm fluoride. Thus without an excess of calcium in the internal phase of the emulsion the fluoride level of the aqueous solution may be reduced only to this level in a continuous operation where fresh emulsion is continuously made up and added to the system, and spent emulsion is continuously withdrawn. In certain applications it is desirable to remove fluoride to a lower level. An excess of calcium ion is thus placed in the internal phase of the emulsion. Thus, by starting with 14 weight % $CaCl_2$ in the internal aqueous phase, and again treating 37 volumes of said aqueous solution containing 1000 ppm fluoride per volume of $CaCl_2$ solution encapsulated in the emulsion, the spent emulsion will contain 4 weight % excess $CaCl_2$. This allows, as is obvious from Table I, removal of fluoride from the aqueous solution to a level of 0.2 ppm.

Again, it is noted that the addition of calcium ion directly to the aqueous solution would yield essentially the same result in that fluoride ion would be removed. However, the calcium ion being used in excess would yield an undesirable degree of contamination in the treated water. Thus additional treatment would be required.

The emulsions useful in removing the water-soluble salts from aqueous solution are generally described in U.S. Pat. No. 3,779,907 herein incorporated by reference above. It is noted that the precipitating reagent which is to be used in the instant process will be selected on the basis of what is known in the art about precipitating of dissolved metal salt components. For example, many metals will precipitate from aqueous solution by combination with sulfide ion. Sulfide ion thus may be used in the internal phase of the emulsion. Again, however, if it is desired to remove the metal to a point below that which is present due to the solubility product of the sulfide precipitate excess sulfide must be used, for example in the form of excess sodium sulfide.

The following are specific embodiments of the instant invention.

EXAMPLE 1

Fluoride Removal by Precipitation as $CaF_2$

The solubility of $CaF_2$ in water is about 0.0016–0.0017 g/100 cc at 18°–25° C. This fixes the attainable fluoride ion level when precipitating $CaF_2$ with the essentially stoichiometric amount of calcium at 8 ppm. The use of a large excess of precipitating calcium ion in the treated waste water to decrease the fluoride ions contribution to the solubility product of the $CaF_2$ precipitate is undesirable as it leads to excessive dissolved calcium salt, which would therefore require additional treatment.

Consequently, it is particularly advantageous to use a large excess of calcium ion on the inside of the liquid membrane emulsion. This can be done by using not only $Ca(OH)_2$ which is only sparingly soluble but will neutralize the fluoride permeating across as it precipitates as $CaF_2$, but also by adding a large excess of $CaCl_2$, say 10 wt. % on the internal solution. As was discussed above, with stoichiometric $Ca(OH)_2$ present, the fluoride concentration inside the emulsion droplets cannot drop below 8 ppm, which sets a corresponding limit to the attainable F-cleanup on the waste water being treated. Incorporation of the above 10% $CaCl_2$ lowers the achievable F-concentration to 0.06 ppm.

EXAMPLE 2

Heavy Metal Removal by Sulfide Precipitation

Similarly to the $CaF_2$ case discussed above, heavy metals can be removed but require a precipitating agent. Sulfide is very effective, but to reach the low residual metal level often required would call for excessive sulfide concentration in the waste water (which normally should have very few ppm of sulfide in it). Again, a high common ion concentration inside the membrane can easily be established by means of $Na_2S$ dissolved in the internal droplets (preferably in the presence of free NaOH to minimize $H_2S$ permeation out of the membrane). This excess sulfide assures very complete removal, via precipitation and permeation, of the heavy metals in the waste water stream.

EXAMPLE 3

Removal of Heavy Metals as Hydroxide

Similar to the sulfide above, hydroxide can be used. Many metals form insoluble hydroxides, i.e., $Fe(OH)_3$, $Mn(OH)_2$, $Cr(OH)_3$ which can be very completely precipitated in a high pH medium, where $[OH^-]$ is high. Again, this can be achieved inside of a liquid membrane emulsion without affecting the pH of the bulk water phase being treated.

What is claimed is:

1. In a process for removing a soluble material from solution by contacting said solution with an emulsion, the external phase of which is immiscible with said solution and permeable to said soluble material and the internal phase contains a reagent which reacts with said permeable soluble material to form an insoluble precipitate, which is trapped in said internal phase, the improvement which comprises maintaining the concentration of said reagent in the internal phase of the emulsion at a level at which the concentration of said soluble material in the internal phase of the emulsion is suppressed by means of the common ion effect to a level below the level to which it is desired to remove said soluble material from said solution.

2. The process of claim 1 wherein said solution is aqueous.

3. The process of claim 2 wherein said soluble material is a salt.

4. The process of claim 3 wherein said permeable soluble material is fluoride ion.

5. The process of claim 4 wherein said internal phase comprises a water soluble calcium salt.

6. The process of claim 5 wherein said internal phase comprises 0.5 to 10% by weight calcium ion.

7. The process of claim 6 wherein said water soluble calcium salt is selected from the group consisting of calcium chloride, calcium nitrate, calcium hydroxide, calcium acetate and mixtures thereof.

8. The process of claim 3 wherein said permeable soluble material is a heavy metal which forms an insoluble precipitate with sulfide ion.

9. The process of claim 8 wherein said internal phase comprises $Na_2S$.

10. The process of claim 3 wherein said permeable soluble material is selected from the group consisting of $Mn^{++}$, $Cr^{+++}$ and $Fe^{+++}$ and said reagent is hydroxide ion.

* * * * *